May 30, 1950 — R. E. KARNUTH ET AL — 2,509,272

AIRCRAFT CONTROL MECHANISM

Filed Aug. 12, 1947

Richard E. Karnuth &
Harold F. Hume
*INVENTORS*

BY *James M. Clark*

THEIR PATENT ATTORNEY

Patented May 30, 1950

2,509,272

UNITED STATES PATENT OFFICE 2,509,272

AIRCRAFT CONTROL MECHANISM

Richard E. Karnuth, Buffalo, N. Y., and Harold F. Hume, Marshallton, Del., assignors to Curtiss-Wright Corporation, a corporation of Delaware Application August 12, 1947, Serial No. 768,100

2 Claims. (Cl. 244—49)

The present invention relates generally to control systems for aircraft and more particularly to improved means for controlling movable portions of a foldable aircraft component.

In the design of folding wing aircraft, great difficulties have been met with in providing a cable control system for controlling a movable surface or other unit mounted upon a foldable panel or portion of a wing, or other component of the airplane. A further problem has been presented in providing a cable control system for such installations which will be taut during the entire folding movement of the folding component. In most prior systems, the cables are caused to become slack when the component is folded thereby permitting the movable surface or controlled unit to operate freely under the influence of any exterior force. In the case of folding wing aircraft, particularly carrier-based military aircraft in which the folding operations are necessarily made at great speed, it has been found particularly desirable to have the control mechanism operable in all positions of folding of the wing portions or panels. It has also been desirable in such aircraft that the movable surfaces of the folding wing panels be at all times under the influence of the control system, and the pilot or operator, in order that these surfaces may be positioned where they will not be subject to damage, and be retained in the desired position to prevent their undesired movements in strong winds, or due to the rolling and pitching of an aircraft carrier in heavy seas.

In prior installations, in which the folding of the aircraft wings permitted slackening of the control cables, the latter were frequently fractured and damaged due to their not falling back into the grooves of the sheaves or pulleys when the folding wing portion was returned to its normal flying position. This has also proven an undesirable and dangerous condition inasmuch as excessive slackening of the control cables has frequently resulted in the cables becoming wedged in other portions of the aircraft structure outside of the sheave grooves. This has also resulted in the inability of the pilot to control the movable surfaces after the wing portion has been locked in its normal flying position. It is also frequently desirable to disconnect the control cables at the juncture of the fixed and foldable wing panels in order to remove or replace an outer foldable panel, and prior devices for accomplishing such disconnections have not proven entirely satisfactory.

It is accordingly a major object of the present invention to provide an improved, simple cable control system for the actuation of a movable surface or other controlled unit mounted upon a foldable wing panel, or other aircraft component. It is also an object to provide such a cable control system which will operate the movable or control surfaces in any position of the foldable component. A further object of this invention is to provide improved actuating means for such movable surfaces mounted upon folding components in which the actuating means is maintained fully operative during the entire folding operation.

It is a still further object of the present invention to provide improved actuating means for movable surfaces mounted upon folding aircraft components embodying control cables which are held at substantially uniform working tension during the folding operation within the sheave grooves to thereby prevent cable failure or fracture, and the possibility of fouling or jamming of the cable in adjacent aircraft structure. It is a further object to provide in such an improved cable actuating system for folding aircraft wings, an improved disconnecting fitting which is relatively simple but effective in its operation of transmitting full cable tension while preventing torque transmission. Other objects and advantages of the present invention will occur to those skilled in the art after reading the present description in conjunction with the accompanying drawings forming a part hereof in which:

Figure 1:
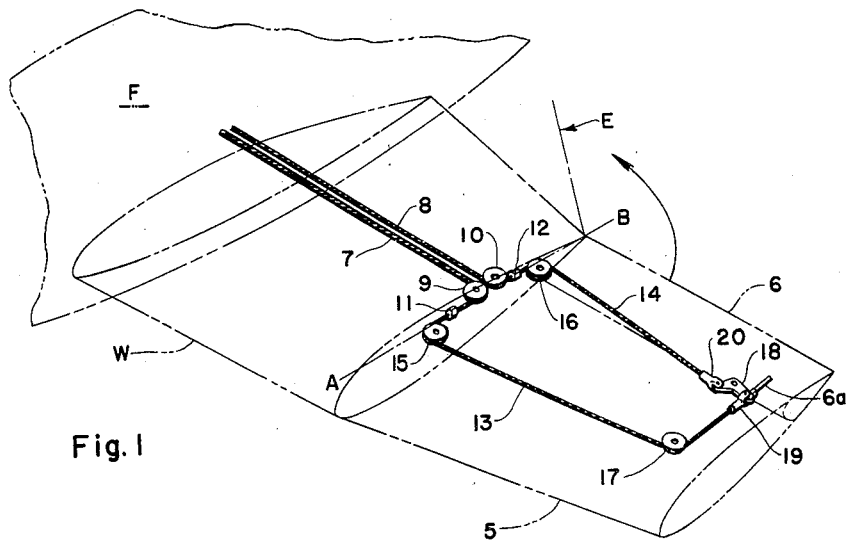
Figure 1 is a perspective view of a folding aircraft wing panel illustrating a form of the improved cable actuating mechanism of the present invention applied thereto.

Referring now to Figure 1, the letter F indicates a fuselage portion of an aircraft having a laterally extending fixed wing W, and an outer foldable wing portion or panel 5. The outer foldable panel 5 has movably associated therewith at its trailing portion a control surface such as the aileron 6, and both the outer panel 5 and its associated aileron 6 are foldable upwardly and inwardly toward the fuselage about the fore and aft folding or hinge axis A—B in the direction of the line E and as indicated by the arrow shown in Figure 1.

Control cables 7 and 8 extend laterally and outwardly from the fuselage F, within which they terminate in a suitable control element such as a pilot control stick, and extend laterally outwardly to the line of the folding axis A—B where they engage the grooved sheaves or pulleys 9 and 10, respectively. The cables 7 and 8 terminate in disconnect fittings 11 and 12, respectively, which will be hereinafter more fully described, and beyond the sheaves 9 and 10 which are pivotally mounted for rotation upon the fixed wing portion W. The inner cable 7 is connected by the fitting 11 to an outer cable counterpart 13, engaging sheave 15 and then extending in a spanwise direction within the folding panel 5 towards its tip portion; and a similar outer cable counterpart 14 is connected by means of the disconnect fitting 12 to its inner cable counterpart 8 passing around the sheave 16.

Sheaves 15 and 16 are pivotally mounted upon the outer or foldable wing panel 5 in such manner that a line drawn tangentially and interconnecting the centers of their grooves coincides with the folding axis A—B, and the sheaves 9 and 10 which are pivotally mounted upon the fixed wing portion W are also similarly but oppositely disposed such that the two-part cable run 7—13 in extending forwardly between the sheaves 9 and 15 coincides with the folding axis A—B; and similarly that the two-part cable run 8—14 in extending rearwardly between the sheaves 10 and 16 also coincides with the folding axis A—B and is in alignment with the cable run 7—13, extending between the sheaves 9 and 15. The outer portion of the forward cable 13 extends over and in engagement with the groove of the forward outer sheave 17, pivotally mounted upon the folding wing panel 5 and then extends rearwardly for connection to an arm of the aileron operating bell crank 18, by means of the clevis terminal fitting 19. The rearward cable 14 extends outwardly and is connected to the remaining arm of the bell crank by means of the clevis terminal fitting 20. The bell crank 18 is pivotally mounted for rotation under the influence of the control cable 13 and 14 and has pivotally attached to one of its arm portions a push-pull rod 6a which is operatively connected for imparting desired control movements to the aileron 6.

Figure 2:
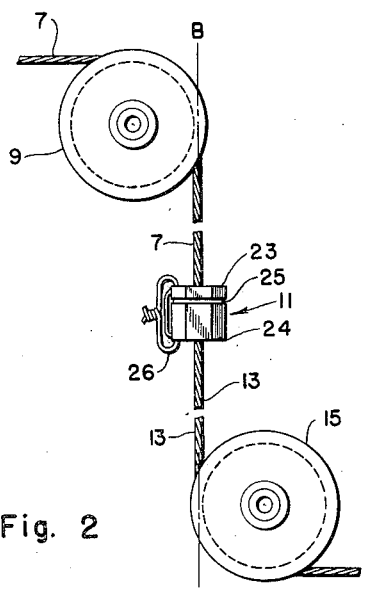
Figure 2 is a plan view of a portion of the cable system at the juncture of the fixed and folding wing panels.
Figure 3:
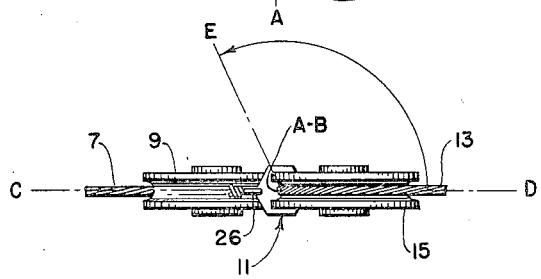
Figure 3 is a front elevational view of the cable system portion shown in Figure 2.

Referring now to Figures 2 and 3, in which only the forward two-part cable pair 7—13 is shown, it will be noted that the sheaves 9 and 15, as referred to above guide the cables 7 and 13 through the intermediate disconnect fitting 11 along the hinge axis A—B about which the outer panel 5 is hinged for folding into the position indicated by the line E in Figure 3. In this figure, the line C—D indicates a substantially horizontal line, and defines a plane, which includes the fore and aft horizontal folding axis A—B, and about which the angle of folding would be represented by the angle E—'AB'—D. It will of course be understood that the inner and outer panels of a folding wing airplane may be provided with dihedral, either positive or negative, or the angle of dihedral of the inner and outer panels may be different either in degree, or sign, or both, and the relative angles at which the cables 7 and 8 meet the cables 13 and 14 at the axis of folding A—B may be affected accordingly. While the cable runs have been shown in the drawing as disposed in the same substantially horizontal plane, it will of course be understood that these cables may meet at any angle, and will operate satisfactorily in accordance with the present invention just so long as their fore and aft portions between the sheaves 9 and 15 on the one hand and the sheaves 10 and 16 on the other, are in alignment and coincide with the axis of folding A—B.

Figure 4:
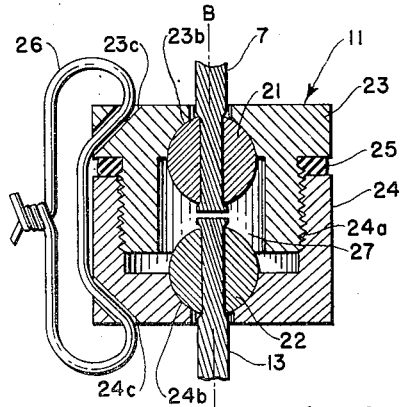
Figure 4 is a detailed cross-sectional view of one of the improved swivelling disconnect fittings shown in the previous figures.

The disconnect fittings 11 and 12 are preferably identical in construction and the fitting 11 shown in Figures 2 and 3, is shown in detailed cross-section in Figure 4. The cable 7 has a terminal ball 21 swaged thereupon and a like terminal ball 22 is swaged upon the terminal of the aligned cable 13. The fitting 11 is comprised of two threadedly engaging parts namely, the cap portion 23 which is externally threaded for engagement with the internal threads 24a of the body, and the latter or retainer portion 24. The portions 23 and 24 are preferably hexagonal or of polygonal shape externally in order that one may be rotated or tightened relative to the other by a means of a wrench or other suitable tool, and their intermediate abutting portions are preferably sealed by a rubber or other composition washer or ring 25. The body portions 23 and 24 are provided with axial bores and part-spherical seat portions 23b and 24b, respectively, within which the terminal balls 21 and 22 are adapted to be universally and rotatively journaled or seated. The peripheral edges of the body portions 23 and 24 are provided with angularly disposed holes 23c and 24c respectively through which a locking wire 26 may be passed to lock the threadedly engaging parts in the desired position. The interior space 27 within the cap fitting 23, and between this fitting and the retainer portion 24, is preferably filled with a suitable lubricant which is sealed in by the ring 25 when the cap 23 is threaded into the retainer 24.

Assuming now that the outer panel 5 is folded about the hinge axis A—B in the direction of the arrow toward the position E of Figures 1 and 3, it will be noted that this can be accomplished without any lengthening of the two-part cable runs 7—13 and 8—14. The rotation of the outer cables 13 and 14, however, with respect to the inner cable 7 and 8, which do not rotate, will cause relative rotation of the fore and aft portions of these cables on the opposite sides of the disconnect fittings 11 and 12. Due, however, to the rotative mountings of the swaged ball terminals 21 and 22 of these cables within the disconnect fitting 11 as shown in Figure 4, the cables are permitted to rotate relative to each other and about the axis of folding A—B in order to prevent torsional twisting of either cable. Inasmuch as the lengths of these cables remain the same, the cables remain engaged within the grooves of the sheaves and the aileron 6 can be operated in any of the many positions into which the foldable wing panel 5 may be rotated, while at the time all torque within the cables will be relieved by the swivelling disconnect fittings 11 and 12.

In the event it is desired to remove the outer folding panel 5 from the fixed inner panel W, the lock wires 26 are removed from the disconnect fittings 11 and 12 which can then be unthreaded and opened with the respective portions of the fittings 23 and 24 remaining intact with their engaging cable portions. This permits the rapid separation of the cable system for the detachment or removal of an outer wing panel and upon its replacement the system is again automatically restored to the desired cable tension by the reengagement and connection of the portions of each of the respective disconnect fittings.

It will accordingly be noted that the improved results derived from the present invention are accomplished by extending a portion of the control cable for a distance which need only be sufficient to accommodate the connecting and torque relieving means, in the direction of and coinciding with the axis about which one of the components folds or is rotated with respect to the other. This is facilitated by pivotally carrying a sheave or other guide means on one of the components and a similar sheave or guide means on the other component so disposed that the cable extending between these sheaves coincides with the folding axis. This arrangement, accordingly, is accomplished simply and efficiently, and permits folding or other relative movements between the components without slackening or tightening of the cables, inasmuch as the total cable distance throughout, from the control stick to the control surface, remains the same during the relative movement of the components, and the cables are relieved of all torque while this relative movement is being made.

The improved arrangement also provides for the operation of the control surface or other units in any relative position of the components; permits movement of the control surface into the desired position when the wings of the aircraft are folded; and allows locking of the surface in this position either at the surface itself or by arresting the control member within the airplane cockpit. While this improved control mechanism is particularly applicable to the control surfaces of folding wing aircraft, it will be apparent that it is also adapted for use in any series of relatively movable components wherein a controlled unit is mounted upon a movable component which in turn is movably mounted upon a fixed component from which the initial controlled unit is desired to be moved by means extending through the movable component upon which it is pivoted, and regardless of the adjusted position of that movable component.

Other forms and modifications of the present invention, both with respect to its general arrangement and the details of its respective parts, which will become apparent to those skilled in the art upon reading the present description are intended to come within the scope and spirit of the invention as more particularly defined in the appended claims.

We claim:

1. Control mechanism for a folding wing airplane having a fixed wing portion, a movable wing portion, hinge means carried by said fixed and said movable wing portions providing an axis of pivotation for the movement of said movable wing portion with respect to said fixed wing portion, and a movable control surface pivotally carried upon said movable wing portion; said control mechanism including continuous cable means extending from said fixed wing portion along the said hinge axis of pivotation to said movable wing portion for the control of said movable surface, a first sheave pivotally mounted upon said fixed wing portion arranged to maintain a portion of said cable means in coincidence with said hinge axis, a second sheave pivotally mounted upon said movable wing portion arranged to maintain a spaced portion of said cable means in coincidence with said hinge axis throughout all of the positions into which said movable wing portion may be moved with respect to said fixed wing portion and swivel means connecting adjacent portions of said cable means intermediate said sheaves for preventing twisting of said cable means.

2. Control surface cable actuating mechanism for a folding wing aircraft having a fixed wing portion, a folding wing portion pivotally mounted upon said fixed wing portion, a movable control surface pivotally mounted upon said folding wing portion, and hinge means for pivotally joining said wing portions upon a pivotal axis; said control surface actuating mechanism including a first guide sheave pivotally mounted upon said fixed wing portion in such manner that the peripheral groove of said sheave is tangent to said hinge axis, a second guide sheave pivotally mounted upon said folding wing portion in such manner that its peripheral groove is also tangent to said hinge axis, a two-part cable extending around said sheaves and having its contiguous aligned ends coaxially disposed along the said hinge axis between said guide sheaves, and swivel means carried by the contiguous ends of said cable arranged to prevent the development of torque during pivotation of said folding wing portion with respect to said fixed wing portion while maintaining the transmission of tension from one cable part to the other for the controlled actuation of said control surface in both the extended and folded conditions of said folding wing portion.

RICHARD E. KARNUTH.
HAROLD F. HUME.

REFERENCES CITED

The following references are of record in the file of this patent:

UNITED STATES PATENTS

| Number | Name | Date |
| --- | --- | --- |
| 1,945,520 | Cornelius | Feb. 6, 1934 |
| 2,076,088 | Malinowski | Apr. 6, 1937 |
| 2,406,073 | Griswold et al. | Aug. 20, 1946 |
| 2,438,548 | Ehmann | Mar. 30, 1948 |

FOREIGN PATENTS

| Number | Country | Date |
| --- | --- | --- |
| 12,770 | Sweden | July 13, 1901 |